(12) United States Patent
Gifford

(10) Patent No.: US 9,476,186 B2
(45) Date of Patent: *Oct. 25, 2016

(54) MAIN VALVE WITH INTERNAL RIGID STRUCTURE

(71) Applicant: Mueller International, LLC, Atlanta, GA (US)

(72) Inventor: Paul Gifford, Chattanooga, TN (US)

(73) Assignee: Mueller International, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/945,960

(22) Filed: Nov. 19, 2015

(65) Prior Publication Data

US 2016/0069050 A1    Mar. 10, 2016

Related U.S. Application Data

(63) Continuation of application No. 13/836,154, filed on Mar. 15, 2013, now Pat. No. 9,222,582.

(51) Int. Cl.
| | |
|---|---|
| *E03B 9/04* | (2006.01) |
| *E03B 9/02* | (2006.01) |
| *F16K 1/42* | (2006.01) |
| *F16K 1/36* | (2006.01) |

(52) U.S. Cl.
CPC . *E03B 9/02* (2013.01); *F16K 1/36* (2013.01); *F16K 1/422* (2013.01); *Y10T 137/0318* (2015.04); *Y10T 137/5327* (2015.04)

(58) Field of Classification Search
CPC ........... E03B 9/04; E03B 9/02; A62C 35/20; Y10T 137/318; Y10T 136/5327; F16K 1/36; F16K 1/422
See application file for complete search history.

(56) References Cited

U.S. PATENT DOCUMENTS

| | | | |
|---|---|---|---|
| 1,352,735 A | * | 9/1920 | Egerton ..................... F16K 1/46 16/DIG. 18 |
| 2,702,686 A | | 6/1950 | Fortune |
| 3,820,755 A | | 6/1974 | Greenwood |
| 4,139,931 A | | 2/1979 | Royce |
| 4,303,223 A | | 12/1981 | Whisenhunt et al. |
| 4,790,341 A | | 12/1988 | Laurel |
| 5,303,937 A | | 4/1994 | Huss et al. |
| 5,441,074 A | | 8/1995 | Kjaer |
| 5,947,152 A | | 9/1999 | Martin et al. |
| 6,488,050 B1 | | 12/2002 | Jabcon |
| 6,886,586 B2 | | 5/2005 | Fluery |

(Continued)

OTHER PUBLICATIONS

Gifford, Paul; Advisory Action for U.S. Appl. No. 13/836,154, filed Mar. 15, 2013, mailed Apr. 14, 2015, 3 pgs.

(Continued)

*Primary Examiner* — Craig Schneider
*Assistant Examiner* — Kevin Barss
(74) *Attorney, Agent, or Firm* — Taylor English Duma LLP

(57) ABSTRACT

A valve assembly includes a valve plate and a reversible main valve contacting the valve plate. The main valve has an internal rigid structure and an outer shell, the internal rigid structure having a top surface, a bottom surface, and a side surface. The internal rigid structure is at least partially enclosed by the outer shell, the outer shell defining a side surface and a radially outermost edge on the side surface, the side surface of the outer shell including a beveled portion extending from the radially outermost edge of the side surface of the outer shell towards a top surface of the outer shell.

20 Claims, 4 Drawing Sheets

(56) References Cited

U.S. PATENT DOCUMENTS

| | | | |
|---|---|---|---|
| 7,275,732 B2 | 10/2007 | Kato et al. | |
| 9,222,582 B2 * | 12/2015 | Gifford | F16K 1/36 |
| 2014/0261699 A1 | 9/2014 | Gifford | |

OTHER PUBLICATIONS

Gifford, Paul; Final Office Action for U.S. Appl. No. 13/836,154, filed Mar. 15, 2013, mailed Feb. 6, 2015, 13 pgs.

Gifford, Paul; Non-Final Office Action for U.S. Appl. No. 13/836,154, filed Mar. 15, 2013, mailed Sep. 30, 2014, 25 pgs.

Gifford, Paul; Non-Final Office Action for U.S. Appl. No. 13/836,154, filed Mar. 15, 2013, mailed Jun. 8, 2015, 19 pgs.

Gifford, Paul; Notice of Allowance for U.S. Appl. No. 13/836,154, filed Mar. 15, 2013, mailed Sep. 18, 2015, 5 pgs.

Gifford, Paul; U.S. Patent Application entitled: Main Valve With Internal Rigid Structure, U.S. Appl. No. 13/836,154, filed Mar. 15, 2013; 16 pgs.

Sliger, Matthew; U.S. Patent Application entitled: Main Valve With Grooved Rigid Internal Structure having U.S. Appl. No. 14/615,971, filed Feb. 6, 2015, 24 pgs.

Gifford, Paul; International Preliminary Report on Patentability for PCT/US14/20063, filed Mar. 4, 2014, mailed Sep. 24, 2015, 7 pgs.

Gifford, Paul; International Search Report and Written Opinion for serial No. PCT/US14/20063, filed Mar. 4, 2014, mailed Jun. 23, 2014, 9 pgs.

Gifford, Paul; PCT Application entitled: Main Valve with Internal Rigid Structure, having serial No. PCT/US14/20063, filed Mar. 4, 2014, 16 pgs.

Gifford, Paul; Corrected Notice of Allowability for U.S. Appl. No. 13/836,154, filed Mar. 15, 2013, mailed Nov. 25, 2015, 4 pgs.

Gifford, Paul; Issue Notification for U.S. Appl. No. 13/836,154, filed Mar. 15, 2013, mailed Dec. 9, 2015, 1 pg.

Sliger, Matthew; PCT Application entitled: Main Valve With Grooved Rigid Internal Structure having serial No. PCT/US16/14796, filed Jan. 26, 2016, 25 pgs.

Sliger, Matthew; International Search Report and Written Opinion for PCT Application No. PCT/US2016/014796, filed Jan. 26, 2016, mailed Jun. 3, 2016, 10 pgs.

* cited by examiner

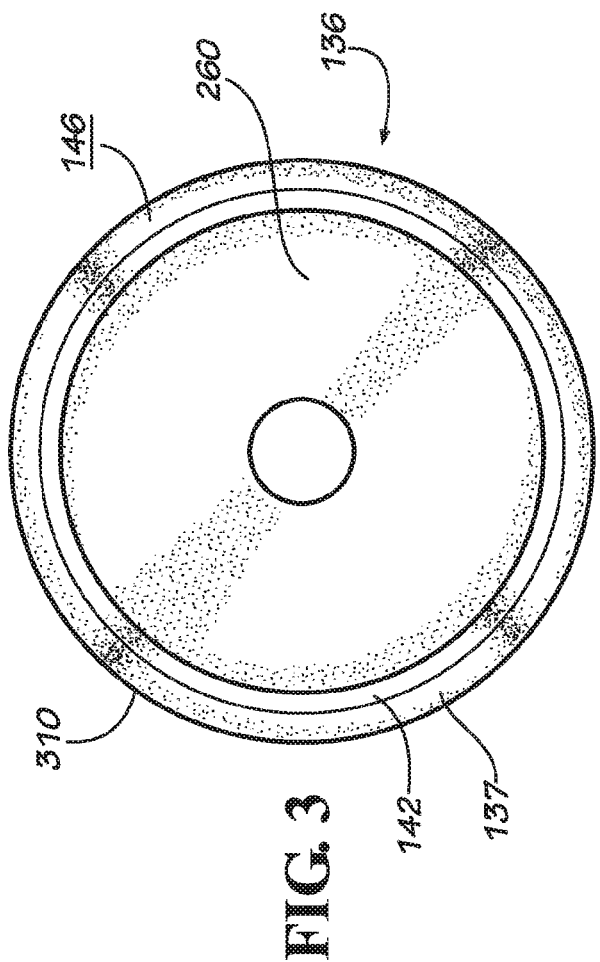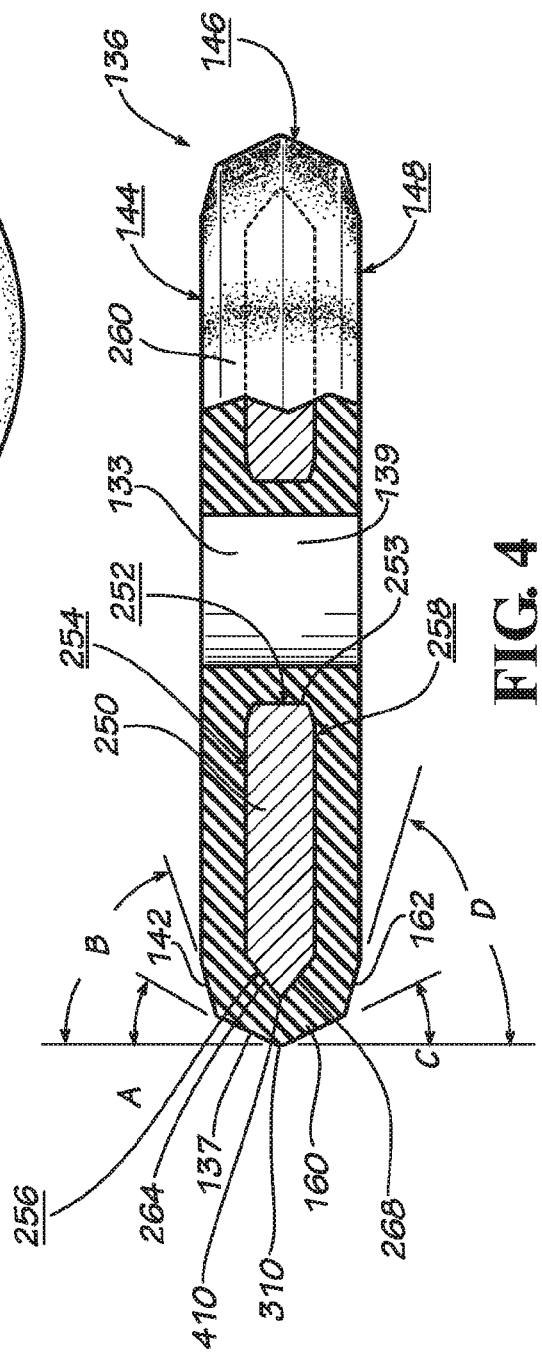

MAIN VALVE WITH INTERNAL RIGID STRUCTURE

CROSS-REFERENCE TO RELATED APPLICATIONS

This application is a continuation of U.S. application Ser. No. 13/836,154, filed Mar. 15, 2013, which is hereby specifically incorporated by reference herein in its entirety.

TECHNICAL FIELD

This disclosure relates to valves. More specifically, this disclosure relates to main valves.

BACKGROUND

Valve elements are used to regulate or control the flow of material by opening, closing, or partially obstructing various passageways. One type of valve is a main valve, which can be used in a number of applications, such as within a hydrant shoe of a dry-barrel fire hydrant.

SUMMARY

Disclosed is a valve assembly comprising a valve plate and a reversible main valve contacting the valve plate. The main valve has an internal rigid structure and an outer shell, the internal rigid structure having a top surface, a bottom surface, and a side surface. The internal rigid structure is at least partially enclosed by the outer shell, the outer shell defining a side surface and a radially outermost edge on the side surface, the side surface of the outer shell including a beveled portion extending from the radially outermost edge of the side surface of the outer shell towards a top surface of the outer shell.

Also disclosed is a valve assembly comprising a valve plate and a reversible main valve contacting the valve plate in which the main valve has an internal rigid structure and an outer shell, the internal rigid structure having a top surface, a bottom surface, and a side surface, the side surface including an angled portion, the internal rigid structure being at least partially enclosed by the outer shell.

Also disclosed is a valve assembly comprising a valve plate and a main valve contacting the valve plate, the main valve having an internal rigid structure and an outer shell, the internal rigid structure having a top surface, a bottom surface, and a side surface, the internal rigid structure being at least partially enclosed by the outer shell, the outer shell defining a side surface and a radially outermost edge on the side surface, the side surface of the outer shell including a first beveled portion and a second beveled portion, the first beveled portion extending from the radially outermost edge of the side surface of the outer shell towards a top surface of the outer shell, the second beveled portion extending from the radially outermost edge of the side surface of the outer shell to the bottom surface of the outer shell.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 3 is a top view of a main valve of the valve of FIG. 2.

FIG. 4 is a partial cross-sectional side view of the main valve of FIG. 3.

DETAILED DESCRIPTION

Disclosed is a main valve and associated methods, systems, devices, and various apparatus. The main valve includes an internal rigid structure. It would be understood by one of skill in the art that the disclosed main valve is described in but a few exemplary embodiments among many. No particular terminology or description should be considered limiting on the disclosure or the scope of any claims issuing therefrom.

Figure 1:
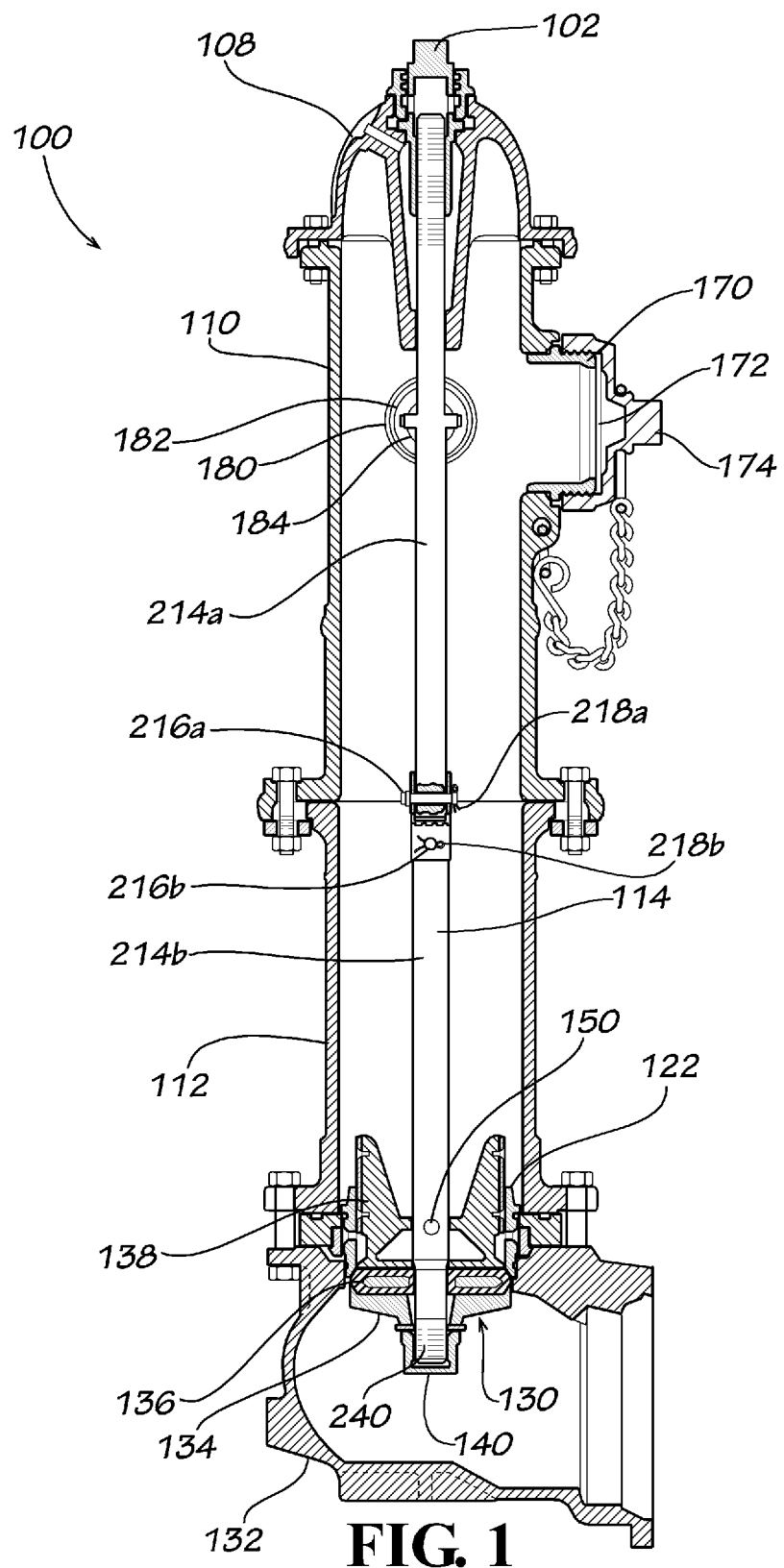
FIG. 1 is a cross-sectional view of a hydrant in accordance with one embodiment of the current disclosure.

One embodiment of a main valve 136 mounted in a hydrant 100 is shown in FIG. 1 and described below. In the current embodiment, the hydrant 100 is a dry-barrel fire hydrant having a hydrant body 110, a bonnet 108 connected to the top of hydrant body 110, a vertical barrel 112 connected to the bottom of hydrant body 110, and a hydrant shoe 132 connected to the bottom of vertical barrel 112, which may be connected to a water supply pipe or any other fluid supply pipe. In various embodiments, hydrant 100 may be other types of fire hydrants, such as a wet-barrel fire hydrant, and the disclosure of a dry-barrel fire hydrant should not be considered limiting. In the current embodiment, an operating nut 102 is mounted on the bonnet and has a threaded connection with a stem 114. Stem 114 includes upper stem portion 214a and lower stem portion 214b in the current embodiment connected by a pair of clevis pins 216a,b having cotter pins 218a,b, respectively, though the upper stem portion 214a and lower stem portion 214b may be connected by any fastener in various embodiments, including welding, screws, or bolts, and the stem 114 may be a single unit in various embodiments.

In the current embodiment, a valve assembly 130 is coupled to the lower stem portion 214b. The valve assembly 130 includes a main valve 136, an upper valve plate 138, and a lower valve plate 134. The valve assembly 130 is coupled to the lower stem portion 214b by a cap nut 140 and a stem pin 150. The cap nut 140 is connected to the lower stem portion 214b in the current embodiment by threading 240. The stem pin 150 extends through the lower stem portion 214b and connects with upper valve plate 138. The main valve 136 and the lower valve plate 134 are thereby held between the upper valve plate 138 and the cap nut 140, though the valve assembly 130 may be mounted to the stem 114 by other methods in various embodiments, including fasteners, brackets, threading on the upper valve plate 138 or the lower valve plate 134, welding, or gluing, or the upper valve plate 138 or the lower valve plate 134 may be formed integrally with stem 114, and the present disclosure of a stem pin 150 and a cap nut 140 should not be considered limiting.

In the current embodiment, the hydrant body 110 includes a pumper nozzle 170 defining a pumper nozzle outlet 172 and a hose nozzle 180 defining a hose nozzle outlet 182. The pumper nozzle outlet 172 is covered by a pumper nozzle cap 174 and the hose nozzle outlet 182 is covered by a hose nozzle cap 184. Pumper nozzle cap 174 and hose nozzle cap 184 are removable for attachment of a pumper and a hose, respectively, to the hydrant 100.

Figure 2:
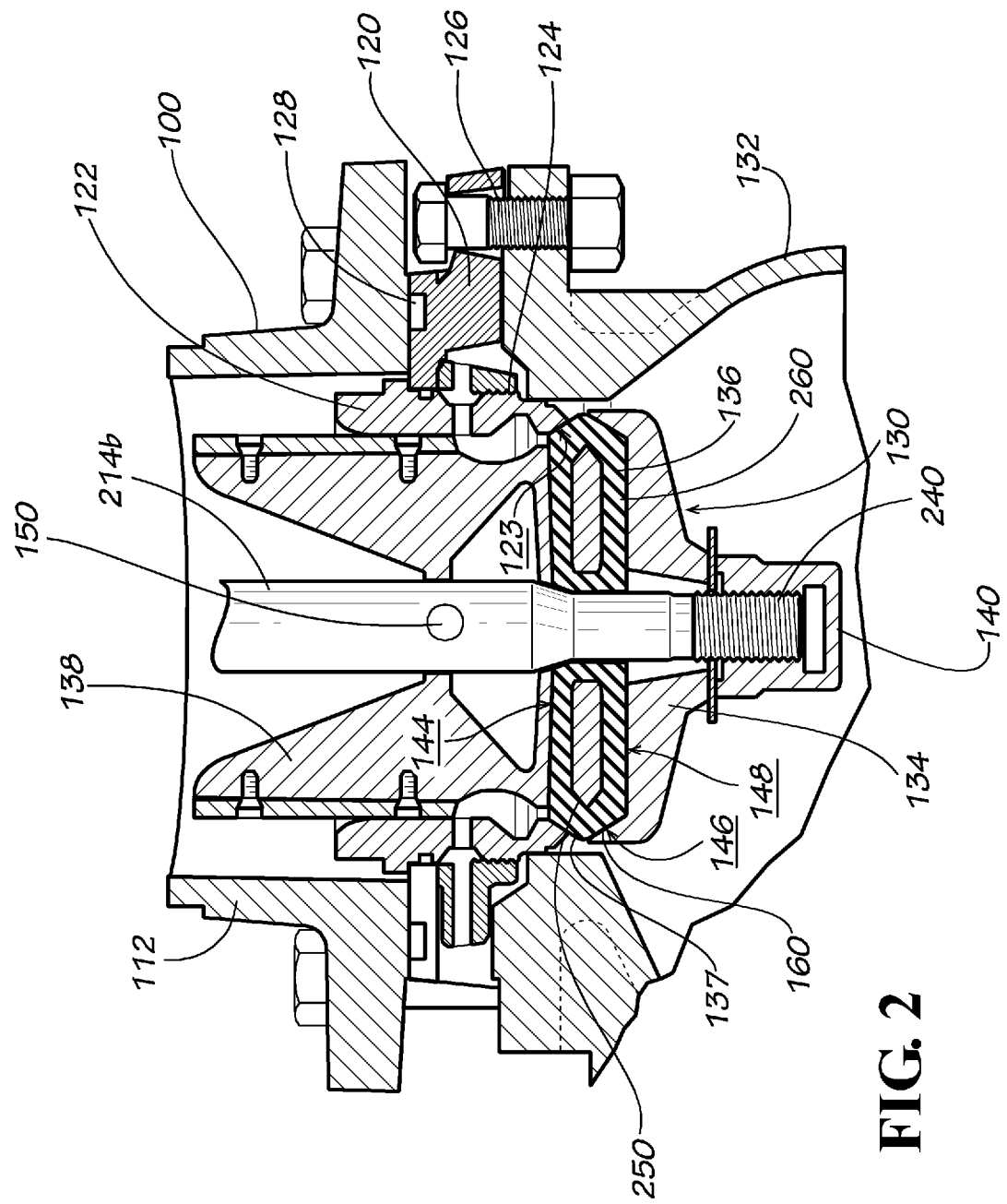
FIG. 2 is a detail cross-sectional view of a lower barrel and a hydrant shoe of the hydrant of FIG. 1 including a valve.

As seen in FIG. 2, a drain ring housing 120 is secured between vertical barrel 112 and hydrant shoe 132 via a bolt 126 and is sealed with respect to vertical barrel 112 using a gasket 128. The drain ring housing 120 may be secured by other methods in different embodiments, such as gluing, welding, brackets, or other fasteners. A seat ring 122 is threadedly engaged to an interior portion of drain ring housing 120 through a threaded connection 124. Seat ring 122 has a beveled seating surface 123 defined in an interior portion thereof for sealing against main valve 136. Main valve 136 includes a side surface 146, a top surface 144, a bottom surface 148, and a bore 133 extending from the top surface 144 to the bottom surface 148. The bore 133 defines an inner surface 139. In the current embodiment, upper valve plate 138 contacts top surface 144 and lower valve plate 134 contacts bottom surface 148. The side surface 146 defines a first beveled portion 137 disposed between bottom surface 148 and top surface 144.

In operation in the current embodiment, to allow water to flow from the water supply pipe to the hydrant body 110, operating nut 102 is turned in one direction, lowering valve stem 114 and thereby causing lower valve plate 134 to urge main valve 136 away from seat ring 122 such that first beveled portion 137 disengages from beveled seating surface 123. To discontinue water flowing from the water supply pipe to the hydrant body 110, operating nut 102 is turned in the opposite direction, raising valve stem 114 and thereby causing lower valve plate 134 to urge main valve 136 towards seat ring 122 such that first beveled portion 137 engages beveled seating surface 123. The hose nozzle outlet 182 and the pumper nozzle outlet 172 are thereby at least indirectly sealable by main valve 136.

FIG. 2 also shows that main valve 136 includes an internal rigid structure 250 enclosed within an outer shell 260. In the current embodiment, the outer shell 260 is formed from a flexible, water-impervious material such as rubber or plastics. Further, in the current embodiment, the internal rigid structure is formed from a rigid material such as cast iron, hard plastic, stainless steel, or other hard materials. The internal rigid structure 250 may be a solid piece or a hollow shell in various embodiments. In the current embodiment, the internal rigid structure 250 is a solid piece and has a top profile that is ring-shaped such that the cross section shown in FIG. 2 extends continuously around stem 114. In various embodiments, the internal rigid structure 250 may include one or more ring portions. In various embodiments, the internal rigid structure 250 may have a top profile shaped like a square, pentagon, hexagon, octagon, or any other shape, and may not include a bore through the center in various embodiments where the stem 114 does not pass through main valve 136, for instance. Further, in various embodiments, the internal rigid structure 250 may not be fully enclosed by outer shell 260, but may be partially enclosed in various embodiments.

FIGS. 3 and 4 show a top view and a partial cross-sectional view, respectively, of the main valve 136. In the current embodiment, side surface 146, top surface 144, and bottom surface 148 are defined on outer shell 260. As seen in FIGS. 3 and 4, the side surface 146 of main valve 136 defines a first beveled portion 137, a second beveled portion 142, a third beveled portion 160, and a fourth beveled portion 162. The first beveled portion 137 extends from a radially outermost edge 310 of surface 146 to a second beveled portion 142 substantially at an angle A and second beveled portion 142 extends from first beveled portion 137 to top surface 144 substantially at an angle B, wherein angle B is larger than angle A. First beveled portion 137 provides a seating portion while the second beveled portion 142 represents additional material missing that limits creep and deformation to extend the useful life of the main valve 136 and better seating and sealing over the useful life of the valve assembly 130. In various embodiments, the second beveled portion 142 may be achieved by introducing a radius between the first beveled portion 137 and the top surface 144.

The third beveled portion 160 extends from radially outermost edge 310 to fourth beveled portion 162 at an angle C and fourth beveled portion 162 extends from third beveled portion 160 to bottom surface 148 substantially at an angle D, wherein angle D is larger than angle C. In various embodiments, the fourth beveled portion 162 may be achieved by introducing a radius between the third beveled portion 160 and the bottom surface 148.

In the current embodiment, angle C is approximately equal to angle A and angle D is approximately equal to angle B, though angles A and C and/or angles B and D, respectively, may be different from each other in various embodiments. Thus, in the current embodiment, the top portion of main valve 136 is substantially identical to the bottom portion of main valve 136. This advantageously allows main valve 136 to be reversible such that if the top portion of main valve 136 becomes damaged or fatigued, main valve 136 may be 'flipped' over such that the bottom portion of main valve 136 may be used to form a seal with beveled seating surface 123. Thus, reversible main valve 136 with improved sealing affords the ability to affect a repair even when a replacement part is not available. The matching contours of the top portion and bottom portion of main valve 136 may therefore facilitate more resilient and better sealing.

Further, as can be seen in FIG. 4, in the current embodiment, internal rigid structure 250 defines a top surface 254, a bottom surface 258, a bore 253 extending from the top surface 254 to the bottom surface 258, and a side surface 256. The bore 253 defines an inner surface 252. In one aspect, an inner diameter of the bore 133 of the main valve 136 is defined by the outer shell 260 and can be less than an inner diameter of the bore 253 of the internal rigid structure 250. In the current embodiment, side surface 256 defines a radially outermost edge 410, a first angled portion 264 extending from radially outermost edge 410 to top surface 254, and a second angled portion 268 extending from radially outermost edge 410 to bottom surface 258. In the current embodiment, first angled portion 264 has a first angle that is approximately equal to a second angle of second angled portion 268, though the first angle and the second angle may not be equal in various embodiments. In addition, radially outermost edge 410 of internal rigid structure 250, in the current embodiment, is approximately coplanar with radially outermost edge 310 of main valve 136, though radially outermost edge 410 may not be coplanar with radially outermost edge 310 in various embodiments.

Figure 5:
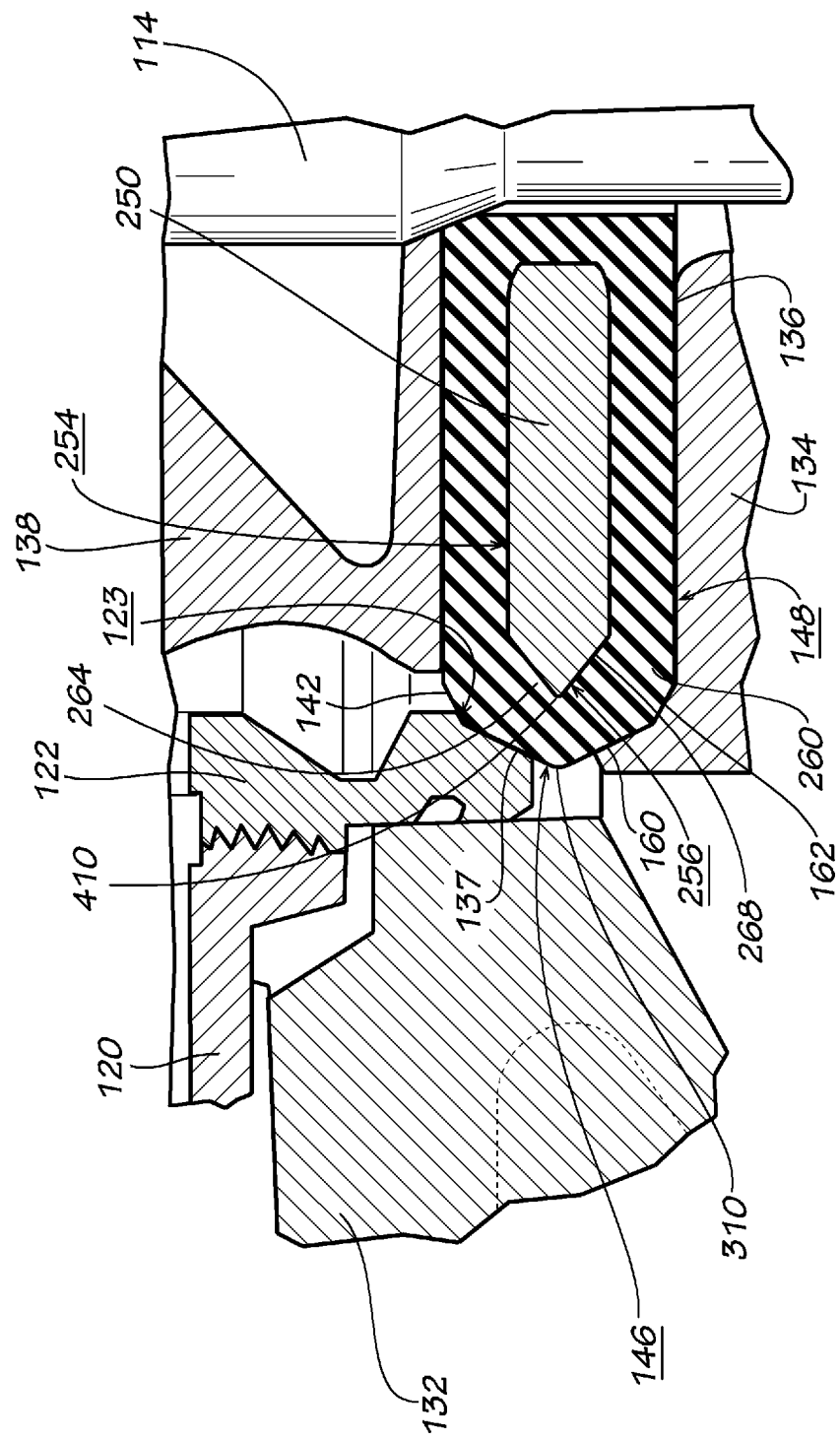
FIG. 5 is a detail cross-sectional view of the main valve of FIG. 2 mounted in the hydrant shoe.

As can be seen in FIG. 5, main valve 136 advantageously allows a sufficient seal to develop between first beveled portion 137 and a beveled seating surface 123 of seat ring 122 at a smaller diameter, thus providing a higher leak point. Therefore, a greater amount of force per unit area is applied at the interface between seat ring 122 and main valve 136. As a result, sealing may be accomplished with less total force and less deformation of main valve 136. Moreover, plastic creep may not occur into the gap between upper valve plate 138 and seat ring 122, since angle B between first beveled portion 137 and second beveled portion 142 reduces the diameter of main valve 136 immediately adjacent to the gap, advantageously lengthening the life of the valve. The same is provided as described hereinbefore, with respect to the bottom portion if/when the valve element is flipped in service.

In addition, in the current embodiment, internal rigid structure 250 provides support to outer shell 260 such that main valve 136 is capable of withstanding higher operating pressures than main valves lacking internal rigid structure 250, such as solid rubber main valves. Further, internal rigid structure 250 prevents main valve 136 from plastic creep occurring into the gap between upper valve plate 138 and seat ring 122. In the current embodiment, first angled portion 264 provides support to first beveled portion 137 and second beveled portion 142, and second angled portion 268 provides support to third beveled portion 160 and fourth beveled portion 162. However, first angled portion 264 and second angled portion 268 may not be present in various embodiments, and internal rigid structure 250 may be included in various main valves not including any of first beveled portion 137, second beveled portion 142, third beveled portion 160, and fourth beveled portion 162.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment. Moreover, unless specifically stated any use of the terms first, second, top, bottom, upper, lower, etc. do not denote any order or importance or absolute positioning, but rather the terms first, second, top, bottom etc. are used to distinguish one element from another. Further, the size, shape, thickness, and other dimensions and features of the various components shown in the figures are for illustrative purposes and should not be considered limiting. The drawings are not drawn to scale.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A valve assembly comprising:
a valve plate; and
a reversible main valve contacting the valve plate, the main valve having an internal rigid structure and an outer shell and defining a top surface and a bottom surface, the internal rigid structure defining
a top surface,
a bottom surface,
a bore extending from the top surface of the internal rigid structure to the bottom surface of the internal rigid structure, and
a side surface, the internal rigid structure being at least partially enclosed by the outer shell,
the outer shell defining a side surface and a radially outermost edge on the side surface, the side surface of the outer shell including a beveled portion extending from the radially outermost edge of the side surface of the outer shell towards the top surface of the main valve, the main valve defining a bore extending from the top surface of the main valve to the bottom surface of the main valve,
wherein an inner diameter of the bore of the main valve is less than an inner diameter of a bore of the internal rigid structure.

2. The valve assembly of claim 1, wherein the main valve is reversible about the radially outermost edge.

3. The valve assembly of claim 1, wherein the internal rigid structure is fully enclosed by the outer shell.

4. The valve assembly of claim 1, wherein the internal rigid structure is a solid piece of material.

5. The valve assembly of claim 1, wherein the internal rigid structure is formed from metal.

6. The valve assembly of claim 1, wherein the outer shell is formed from a flexible material.

7. The valve assembly of claim 1, wherein the bore of the main valve is aligned along an axial center axis of the main valve.

8. The valve assembly of claim 1, wherein the outer shell of the main valve covers an inner surface of the internal rigid structure.

9. A valve assembly comprising:
a valve plate; and
a reversible main valve contacting the valve plate, the main valve having an internal rigid structure and an outer shell, the internal rigid structure defining
a top surface,
a bottom surface,
an inner surface defining a bore extending from the top surface of the internal rigid structure to the bottom surface of the internal rigid structure, and
a side surface, the side surface including an angled portion, the internal rigid structure being at least partially enclosed by the outer shell;
wherein the main valve defines a bore extending from the top surface of the main valve to the bottom surface of the main valve, and wherein the outer shell of the main valve covers the inner surface of the internal rigid structure.

10. The valve assembly of claim 9, wherein the main valve is reversible about the radially outermost edge.

11. The valve assembly of claim 9, wherein the internal rigid structure is formed from metal.

12. The valve assembly of claim 9, wherein the angled portion extends from a radially outermost edge of the side surface towards the top surface of the internal rigid structure.

13. The valve assembly of claim 12, wherein the side surface of the internal rigid structure includes a second angled portion extending from the radially outermost edge of the side surface of the internal rigid structure towards the bottom surface of the internal rigid structure.

14. The valve assembly of claim 9, wherein the outer shell is formed from a water-impervious material.

15. A valve assembly comprising:
a valve plate; and
a main valve contacting the valve plate, the main valve having an internal rigid structure and an outer shell and defining a top surface and a bottom surface, the internal rigid structure defining
a top surface,
a bottom surface,
a bore extending from the top surface of the internal rigid structure to the bottom surface of the internal rigid structure, and
a side surface, the internal rigid structure being at least partially enclosed by the outer shell,
the outer shell defining a side surface and a radially outermost edge on the side surface, the side surface of the outer shell including a first beveled portion and a second beveled portion, the first beveled portion extending from the radially outermost edge of the side surface of the outer shell towards a top surface of the main valve, the second beveled portion extending from the radially outermost edge of the side surface of the outer shell to the bottom surface of the main valve, the main valve defining a bore extending from the top surface of the main valve to the bottom surface of the main valve, wherein an inner diameter of the bore of the main valve is less than an inner diameter of a bore of the internal rigid structure.

16. The valve assembly of claim 15, wherein the main valve is reversible about the radially outermost edge.

17. The valve assembly of claim 15, wherein the internal rigid structure is formed from metal.

18. The valve assembly of claim 15, wherein the outer shell includes a flexible material.

19. The valve assembly of claim 15, wherein the internal rigid structure is ring-shaped.

20. The valve assembly of claim 15, wherein the outer shell of the main valve covers an inner surface of the internal rigid structure.

* * * * *